(12) United States Patent
Sase et al.

(10) Patent No.: US 6,377,480 B1
(45) Date of Patent: Apr. 23, 2002

(54) SOFT START CIRCUIT FOR SWITCHING POWER SUPPLY

(75) Inventors: Takashi Sase, Hitachi; Fumio Murabayashi, Urizura-machi; Mutsumi Kikuchi, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/928,442

(22) Filed: Aug. 14, 2001

(30) Foreign Application Priority Data

Jan. 18, 2001 (JP) ............................................ 13-009659

(51) Int. Cl.[7] .............................. H02M 1/12; H02M 1/14
(52) U.S. Cl. ............................. 363/49; 363/41; 323/901
(58) Field of Search ............................. 363/41, 49, 50, 363/901, 908

(56) References Cited

U.S. PATENT DOCUMENTS

| 5,675,485 | A | | 10/1997 | Seong | |
|---|---|---|---|---|---|
| 5,698,973 | A | * | 12/1997 | Goerke et al. | 323/901 |
| 5,861,737 | A | * | 1/1999 | Goerke et al. | 323/282 |
| 5,903,451 | A | * | 5/1999 | Wu et al. | 323/49 |
| 5,917,313 | A | * | 6/1999 | Callhan, Jr. | 323/288 |
| 6,118,263 | A | * | 9/2000 | O'Neill et al. | 323/315 |
| 6,184,663 | B1 | * | 2/2001 | Imai et al. | 323/274 |
| 6,188,210 | B1 | * | 2/2001 | Tichauer et al. | 323/273 |
| 6,316,926 | B1 | * | 11/2001 | Savo et al. | 323/282 |

FOREIGN PATENT DOCUMENTS

| JP | 02-007115 | 1/1990 |
|---|---|---|
| JP | 08-317637 | 11/1996 |
| JP | 09-074737 | 3/1997 |
| JP | 09-233806 | 9/1997 |

* cited by examiner

*Primary Examiner*—Bao Q. Vu
(74) *Attorney, Agent, or Firm*—Dickstein Shapiro Morin & Oshinsky LLP

(57) ABSTRACT

In a switching power source comprising a triangular wave generating circuit and an error amplifier and a PWM comparator, in normal time PWM pulses being obtained by comparing an output amplitude of triangular wave of the triangular wave generating circuit with an output voltage of the error amplifier as a reference voltage using the PWM comparator, the soft-start circuit of the switching power source comprises a soft-start reference value setting part composed of a group of resistance networks and a group of switches using the same structure as an upper-and-lower limit setting part, composed of networks and switches, for setting an upper and a lower limits of the amplitude of triangular wave of the triangular generating circuit; and a counting circuit for counting cycles of the triangular wave of the triangular wave generating circuit to obtain a plurality of arbitrary soft-start timings in order to switch the group of switches.

8 Claims, 10 Drawing Sheets

SOFT START CIRCUIT FOR SWITCHING POWER SUPPLY

BACKGROUND OF THE INVENTION

The present invention relates to a soft-start circuit for a switching power source, and particularly to a soft-start circuit suitable for being implemented in a power source LSI chip.

The soft-start circuit for the switching power source is a circuit for preventing occurrence of an overshoot (a rush current flowing through a main SW) at starting the switching power source by gradually opening a PWM pulse width from a minimum pulse width to slowly increasing a DC converted output of the power source. As known methods of performing soft start, there are methods of performing soft start using an exponential function voltage of a CR circuit or using an integrated voltage of a capacitor are disclosed in Japanese Patent Application Laid-Open No.8-317637, Japanese Patent Application Laid-Open No.9-233806, U.S. Pat. No. 5,675,485; and a method of generating a PWM signal using a digital circuit structure according to an instruction of a microcomputer is disclosed in Japanese Patent Application Laid-Open No.9-74737; and a method of generating a ramp voltage according to an instruction data of a microcomputer through a D/A converter is disclosed in Japanese Patent Application Laid-Open No.2-7115.

In order solve the above problem, in the first method, an external CR circuit or a circuit composed of a constant current source and an external capacitor is added to the switching power source, and the soft-start time period is determined by a time constant of the CR circuit or an integrating time of the capacitor. There is a problem that the capacitor can not be implemented in the power source LSI because a large capacitor of several tens nF to several $\mu$F is necessary to obtain the soft-start time period of several ms to several tens ms.

On the other hand, since the second or the third method uses a mainly digital circuit structure suitable for LSI, the digital circuit can be implemented in the LSI. However, because the digital circuit is large in circuit scale and soft-started (or initialized) by microcomputer control, it is necessary to start up a power source of the microcomputer before starting the controlled circuit (the power source circuit). Therefore, the second or the third method has a problem in that the method does not fit to general-purpose switching power sources which do not require microcomputer control.

SUMMARY OF THE INVENTION

An object of the present invention is to materialize a soft-start circuit of a switching power source, and particularly to materialize a soft-start circuit without using any external capacitor in order to eliminate external parts. Another object of the present invention is to materialize a power source IC small in scale of the soft-start circuit and suitable for a general-purpose switching power source which does not require microcomputer control.

A feature of a soft-start circuit of a switching power source in accordance with the present invention is that in the switching power source comprising a triangular wave generating circuit and an error amplifier and a PWM comparator, in normal time PWM pulses being obtained by comparing an output amplitude of triangular wave of the triangular wave generating circuit with an output voltage of the error amplifier as a reference voltage using the PWM comparator, the soft-start circuit of the switching power source comprises a soft-start reference value setting part composed of a group of resistance networks and a group of switches using the same means as an upper-and-lower limit setting part, composed of networks and switches, for setting an upper and a lower limits of the amplitude of triangular wave of the triangular generating circuit; and a counting circuit for counting cycles of the triangular wave of the triangular wave generating circuit to obtain a plurality of arbitrary soft-start time periods in order to switch the group of switches.

Another feature of a soft-start circuit of a switching power source in accordance with the present invention is constructed in such that a plurality of comparators are used instead of the counting circuit, and each of a plurality of reference voltages extracted from arbitrary voltage dividing points of an output voltage of a reference voltage generating circuit is individually added to one input terminal of each of the plurality of comparators, and a voltage corresponding to a DC converted output of the power source is input to the other input terminal of each of all the comparators.

In order to generate the plurality of reference voltages in the soft-start reference value setting part at starting the power source, cycles of the triangular wave of the triangular wave generating circuit are counted using the counting circuit, and the group of switches described above are sequentially switched every time when the calculated time reaches to each desired time. By doing so, the width of PWM pulse of the PWM comparator can be gradually increased, and therefore, the soft-start circuit having a simple circuit structure can be implemented in an LSI.

On the other hand, in the case where the plurality of comparators are used instead of the counting circuit described above, the group of switches described above are sequentially switched in decreasing order of difference between the reference voltage and the DC converted output voltage of the power source in outputs of the plurality of comparators. By doing so, the width of PWM pulse of the PWM comparator described above is gradually increased from a minimum width toward a wider width, and similarly, the soft-start circuit having a simple circuit structure can be implemented in an LSI.

The above-mentioned features and the other features of the present invention will be described below.

DETAILED DESCRIPTION OF THE PREFERRED EMBODIMENTS

Figure 1:
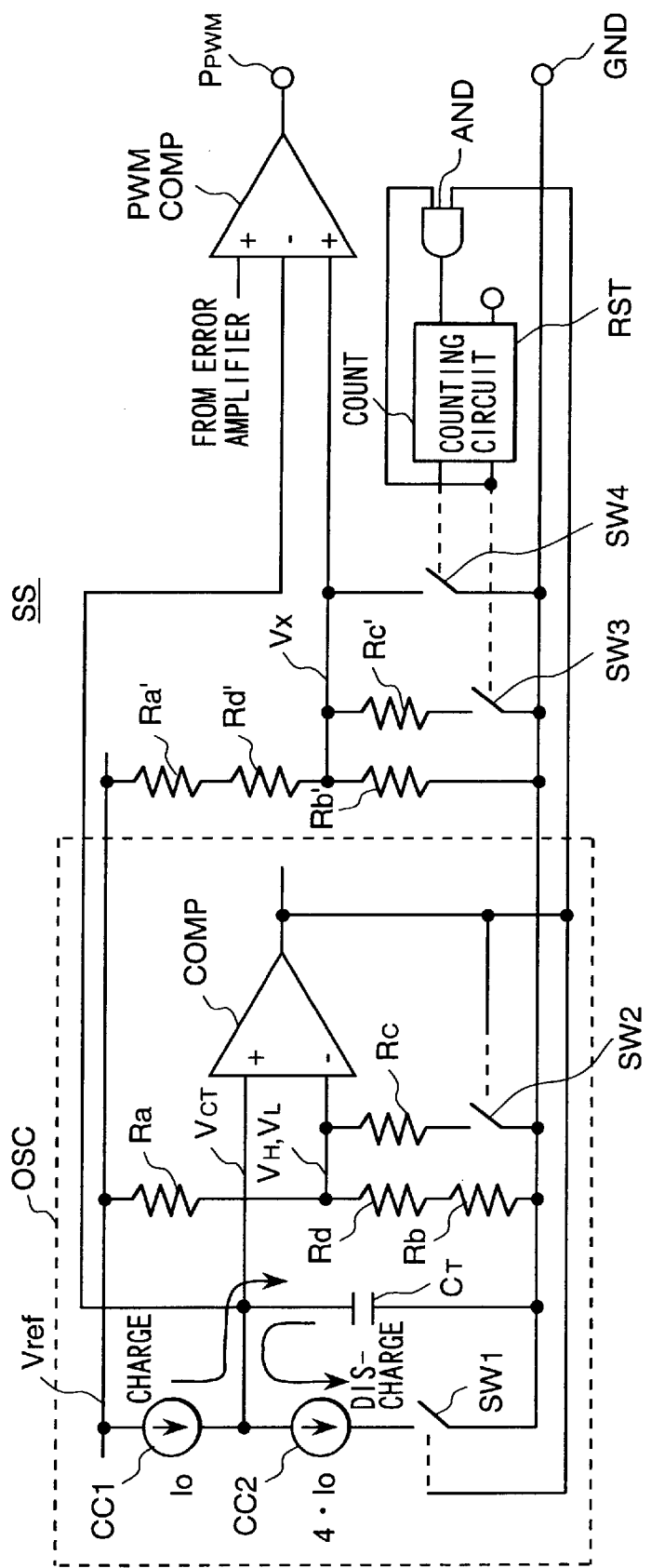
FIG. 1 is a circuit diagram showing an embodiment of a soft-start circuit of a switching power source in accordance with the present invention.

FIG. 1 shows an embodiment of a soft-start circuit of a switching power source. In FIG. 1, the reference character OSC indicates a triangular wave generating circuit (the portion surrounded by a dot line), the reference character SS indicates a soft-start circuit, and the reference character PWMCOMP indicates a PWM comparator. The triangular wave generating circuit OSC comprises a series circuit composed of constant current sources CC1, CC2 and a switch SW1; a series circuit composed of a timing capacitor CT and resistors Ra, Rd, Rb; a series circuit composed of a resistor Rc and a switch SW2; and a comparator COMP. A point of intersection of the constant current sources CC1 and CC2 and one end of the timing capacitor CT are connected to an input terminal (+) of the comparator COMP, and a point of intersection of the resistors Ra and Rd and one end of the resistor Rc are connected to an input terminal (−) of the comparator COMP. Further, the output terminal of the comparator COMP is connected to input control terminals of the switches SW1 and SW2. The soft-start circuit SS comprises a series circuit composed of resistors Ra', Rd', Rb'; a series circuit composed of a resistor Rc' and a switch SW3; a switch SW4; a counting circuit COUNT; and an AND circuit AND. One end of the resistor Rc' and one end of the switch SW4 are connected to a point of intersection of the resistors Rd' and Rb'. As shown in the figure, two output terminals of the counting circuit COUNT are individually connected to control input terminals of the switches SW3 and SW4, and one of the output terminals (connection of the control input to the switch SW3 side) of the counting circuit COUNT is connected to one of input terminals of the AND circuit AND, and further, an output terminal of the AND circuit AND is connected to the counting circuit COUNT. The other input terminal of the AND circuit AND is connected to the comparator COMP of the triangular wave generating circuit OSC. An output of a UVL (under voltage lock, refer to FIG. 10 to be described later) circuit UVL is connected to an input terminal RST of the counting circuit COUNT. Among three input terminals of the PWM comparator PWMCOMP, a first input terminal (+) is connected to an error amplifier EA (refer to FIG. 10 to be described later), and a second input terminal (+) is connected to the point of intersection of the resistors Rd' and Rb' of the soft-start circuit SS, as described above, and an input terminal (−) is connected to one end of the timing capacitor CT. Further, an output voltage Vref of a reference voltage generating circuit VREF (refer to FIG. 10 to be described later) is supplied to one end of the resistor Ra of the triangular wave generating circuit OSC and one end of the resistor Ra' of the soft-start circuit SS.

Operation of the circuit of FIG. 1 constructed as above will be described below.

Operation of the triangular wave generating circuit is that a current value Io of a constant current source CC1 is always conducted to the timing capacitor CT. When a terminal voltage VCT of the timing capacitor CT exceeds a threshold voltage VH of the comparator COMP, the switch SW1 is turned on by an output of the comparator COMP and at the same time the switch SW2 is also turned on. Then, the timing capacitor CT is started to discharge by a current value 4·Io of a constant current source CC2, and the terminal voltage VCT of the timing capacitor CT gradually decreases. When the terminal voltage VCT becomes below the threshold voltage VL of the comparator COMP, both of the switches SW1 and SW2 are again switched off by the output of the comparator COMP to stop the discharge of the current value 4·Io of a constant current source CC2. By repeating the above, the oscillation operation of the triangular wave is performed.

The two threshold voltages VH and VL of an upper and a lower limit values of voltage of the triangular wave can be calculated from the following equations, where values of the resistors Ra, Rd, Rb, Rc are expressed by Ra, Rd, Rb, Rc, and the output voltage of the reference voltage generating circuit VREF is expressed by Vref.

$$VH = \frac{Rd + Rb}{Ra + Rd + Rb} \cdot Vref \quad (1)$$

$$HL = \frac{(Rd + Rb) \, // \, Rc}{Ra + (Rd + Rb) \, // \, Rc} \cdot Vref \quad (2)$$

An oscillation frequency fOSC of the triangular wavw generating circuit OSC can be calculated from the reciprocal of the sum of charging time period t1 and discharging time period t2 of the timing capacitor CT, and the t1 and t2 are expressed by t1=CT (VH−VL)/Io and t2=CT (VH−VL)/(3·Io), respectively. Therefore, the oscillation frequency fOSC becomes as follows.

$$fOSC=1/(t1+t2)=0.75 \cdot Io/\{CT \, (VH-VL)\}$$

Assuming that Io=10 μA, CT=50 pF and VH−VL=0.6 V, fOSC becomes 250 kHz. In a case of high speed operation, the oscillation frequency generally becomes a value smaller than the calculated value because the delay time of the comparator COMP is added to the time period t1+t2.

Figure 2:
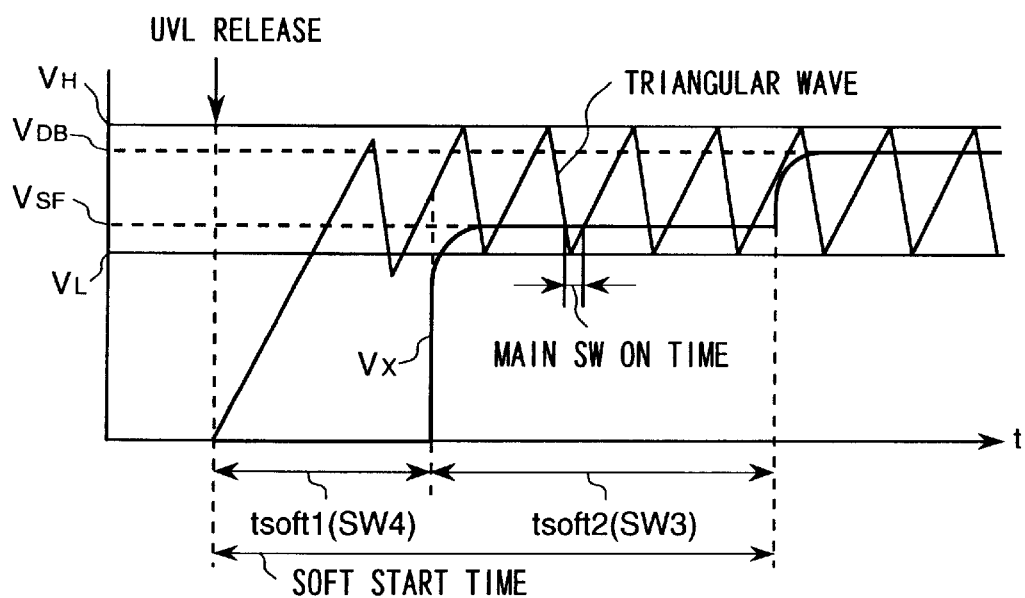
FIG. 2 is a chart showing operation waveforms of FIG. 1.

Since the triangular wave having the oscillation frequency fOSC is generated in the triangular wave generating circuit, as described above, operation of the soft-start circuit SS using the triangular wave will be described below, referring to operating waveform of FIG. 2. Referring to FIG. 2, when the power is turned on and the input voltage VIN to the switching power source is low, the UVL circuit is initially operated to turn the PWM pulse off. When the UVL operation is released, the triangular wave generating circuit OSC starts to generate the triangular wave of FIG. 2 through the operation described above. On the other hand, since the UVL operation of the reset input RST of the counting circuit COUNT of the soft-start circuit SS is also released, the counting circuit COUNT of the soft-start circuit SS starts counting of the output pulses of the comparator COMP of the triangular wave generating circuit OSC. Then, since the counting time in the counting circuit COUNT is in a tsoft1 period of the soft-start time period, the input (reference) voltage Vx of the PWM comparator PWMCOMP becomes 0 (zero) because the switch SW4 is kept to be turned on during this period, as shown in FIG. 2. That is, the period tsoft1 is the period that the output of the triangular wave of the triangular wave generating circuit OSC is determined, and also the period for preventing erroneous operation (a failure) of the main switch SW. Next, because the switch SW4 is turned off and the switch SW3 is turned on when the counting circuit COUNT progresses counting of the output pulses of the comparator COMP and the counting time enters into the tsoft2 period of the soft-start time period, the reference voltage Vx of the PWM comparator PWMCOMP becomes a value VSF, as shown in FIG. 2. During this period, the PWM comparator PWMCOMP performs comparing operation between the triangular wave and the reference voltage Vx to generate and output PWM pulses having a narrow pulse width. That is, the period tsoft2 is the period for preventing occurrence of overshoot at starting operation of the power source by narrowing the ON time period of the main SW. Further, when counting of the output pulses of the comparator COMP is progressed and the counting time exceeds the period tsoft1+tsoft2 of the soft-start time period, the switches SW4 and SW3 are turned off. Therefore, the AND circuit AND prohibits the pulses from inputting to the counting circuit COUNT, and the value of the reference voltage Vx is switched to a value VDB, as shown in FIG. 2, and thus the soft-start operation at starting the power source is completed and normal operation of the power source is started. The PWM comparator PWMCOMP generates PWM pulses by comparing the triangular wave of the triangular wave generating circuit OSC with an output of the error amplifier EA as the reference voltage. Therein, Vx=VDB is for setting a dead band duty, that is, the PWM pulse width is restricted to exceed the limiting value. The relationship among VDB or VSF and the voltage setting resistance values is as follows. Letting the resistance values of the resistors Ra', Rd', Rb', Rc'be Ra', Rd', Rb', Rc', respectively, $$VDB = \frac{Rb'}{Ra' + Rd' + Rb'} \cdot Vref \quad (3)$$

$$VSF = \frac{Rb \,//\, Rc}{Ra' + Rd' + (Rb' \,//\, Rc')} \cdot Vref \quad (4)$$

Figure 4:
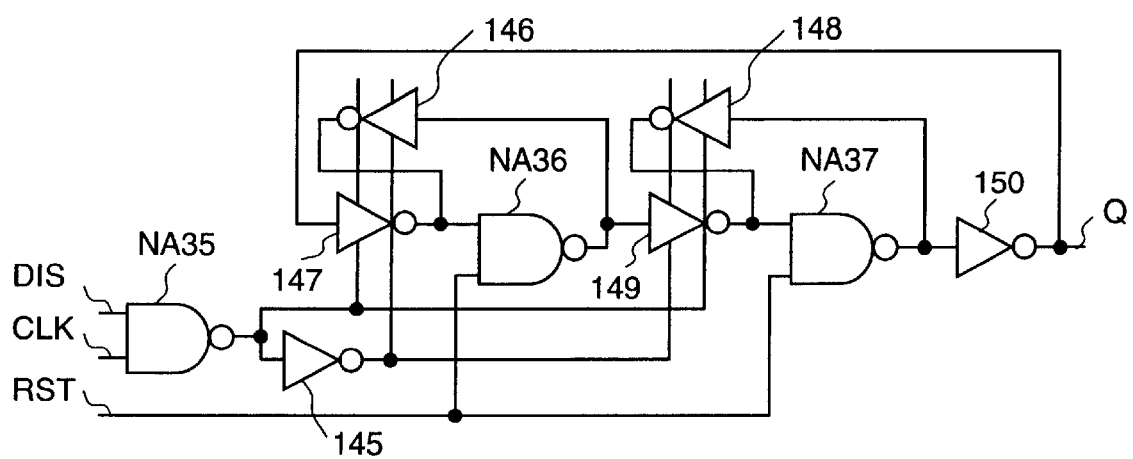
FIG. 4 is a circuit diagram showing an embodiment of the flip-flop of FIG. 3.
Figure 3:
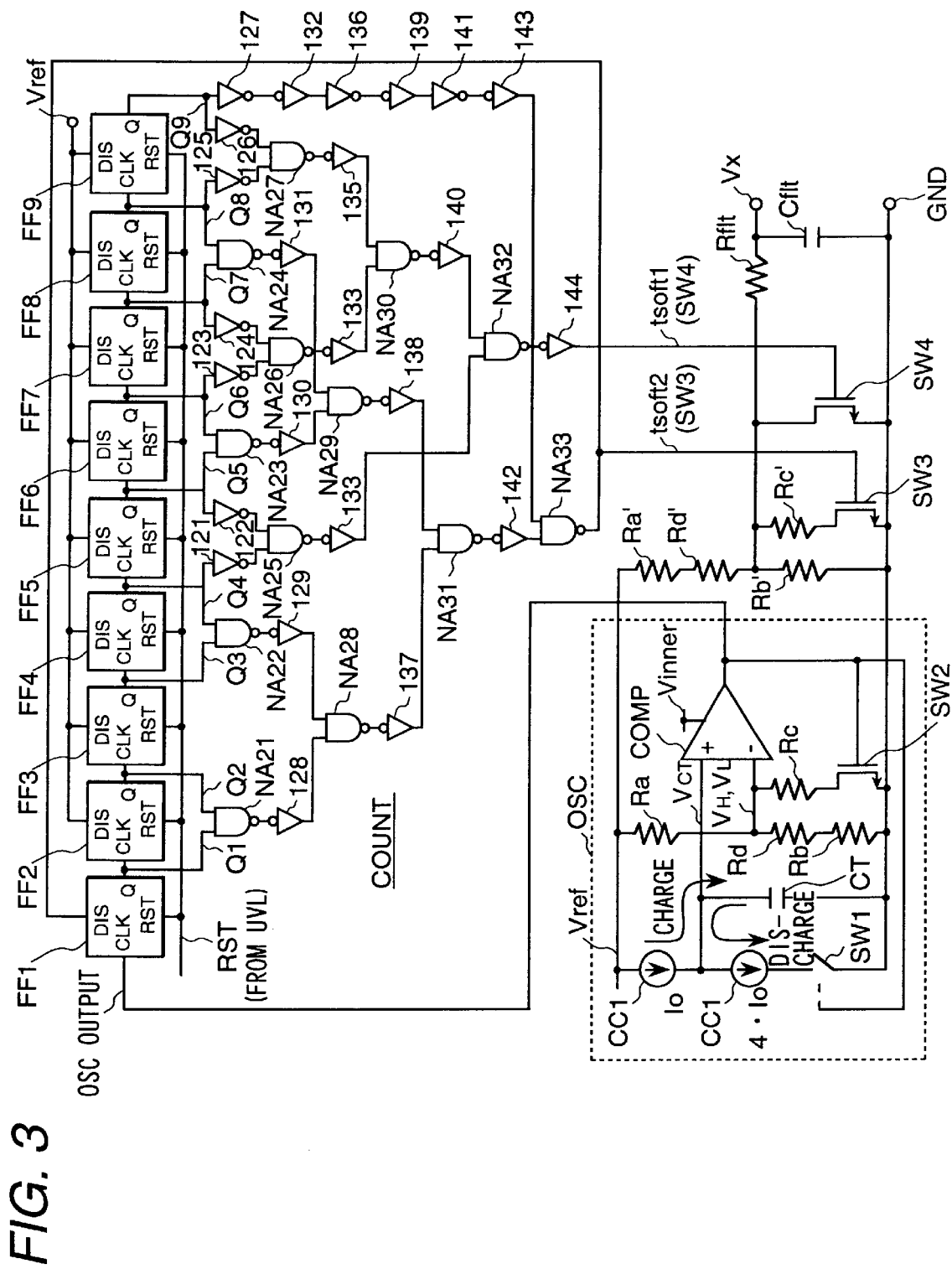
FIG. 3 is a detailed circuit diagram showing the embodiment of a soft-start circuit of the switching power source in accordance with the present invention.
Figure 5:
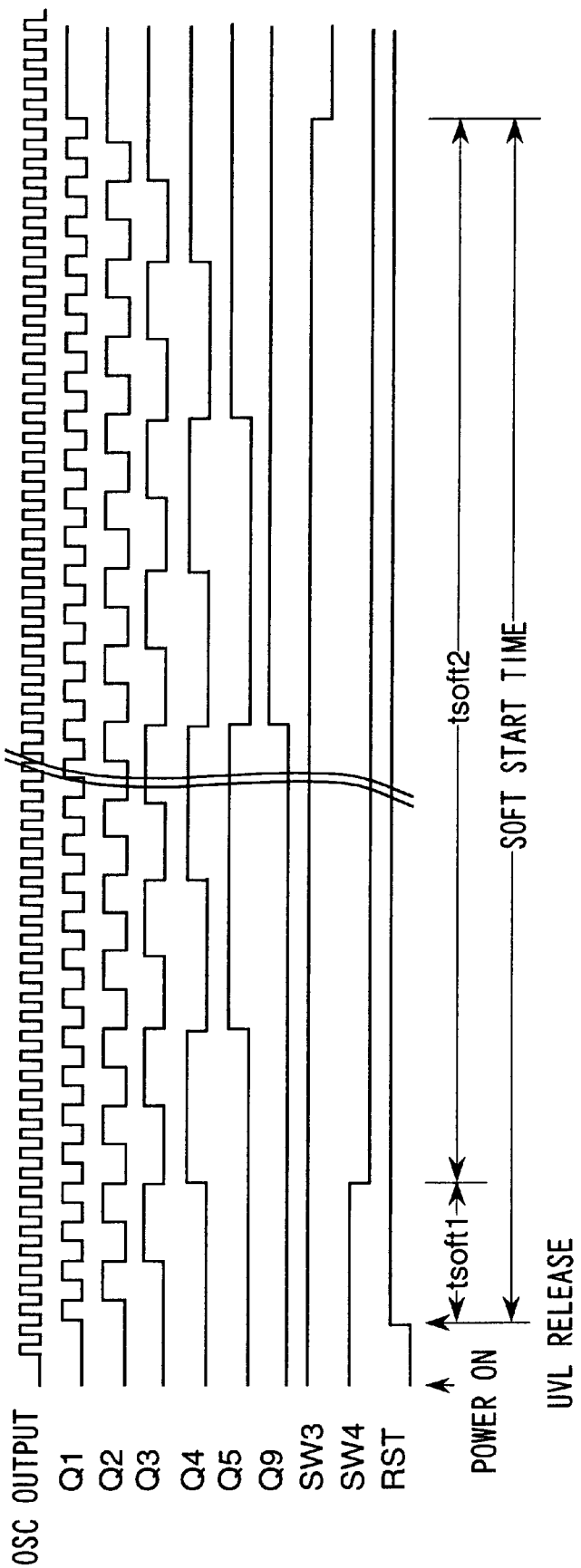
FIG. 5 is a chart showing operating timings of various parts of the counting circuit of FIG. 3.

FIG. 3 is a detailed circuit diagram showing the embodiment of a soft-start circuit of the switching power source of FIG. 1. In FIG. 3, the switches SW3, SW4 of the soft-start circuit SS are replaced with a single channel MOS, and the counting circuit COUNT and the AND circuit AND are constructed of a sequential circuit using flip-flops FF1 to FF9 for dividing the output pulse of the triangular wave generating circuit OSC; and a plurality of NAND circuit NA21 to NA34 for generating timings of the SW3, SW4, shown in FIG. 5; and a plurality of inverter circuits I12 to I44. Therein, an embodiment of a flip-flop used for the flip-flops FF1 to FF9 is as shown in FIG. 4.

In the construction and the operation described above, in the soft-start reference value setting part, the same means as an upper-and-lower value setting part composed of a resistor network Ra to Rd and a switch SW2 of the triangular wave generating circuit OSC is used, and the same kinds and shapes of resistors as the resistors for setting the upper limit value VH and the lower limit value VL of the triangular wave of the triangular wave generating circuit OSC are used, and further the same reference voltage Vref is used. Therefore, the method of relatively setting voltages suitable for LSI can be formed because the set values of VSF, VDB as the Vx values can be highly accurately set between the voltages VH and VL, and accordingly the stable values of VSF and VDB can be obtained. Further, since the soft-start time period can be obtained from the counting circuit using the output pulses of the triangular wave generating circuit OSC, no external capacitor is necessary, differently from the conventional soft-start circuit, and consequently the external parts can be eliminated.

Figure 6:
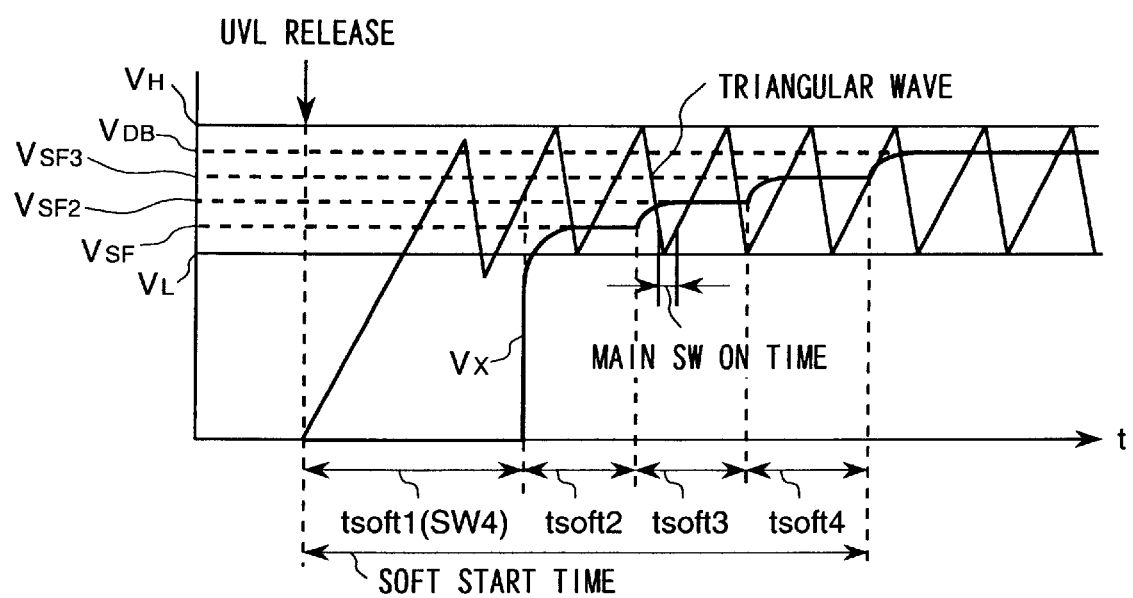
FIG. 6 is a chart showing multi-step switching operation waveforms of FIG. 2.

Although the Vx value is composed of the two values of VSF and VDB in the above-described embodiment, the Vx value may be switched in multi-steps, as shown in FIG. 6. FIG. 6 shows three-step switching, but the number of steps is not limited. Operation of FIG. 6 can be performed by connecting circuits equivalent to the series circuit composed of the resistor Rc' and the switch SW3 to the series circuit composed of the resistor Rc' and the switch SW3 in parallel, and changing the sequential circuit of the counting circuit COUNT of FIG. 3 so as to generates tsoft2, tsoft3, tsoft4 of the soft-start time period for controlling the plurality of switches (here, the structure of the sequential circuit for controlling the plurality of switches is not shown). In that case, the necessary Vx values of VSF, VSF2, VSF3 can be obtained by determining resistor values so as to satisfy Equation (4). By doing as described above, the Vx value can be also increased stepwise by simulating the exponential function voltage using a CR circuit or the integration voltage using a capacitor in the conventional case of using the external capacitor.

Figure 12:
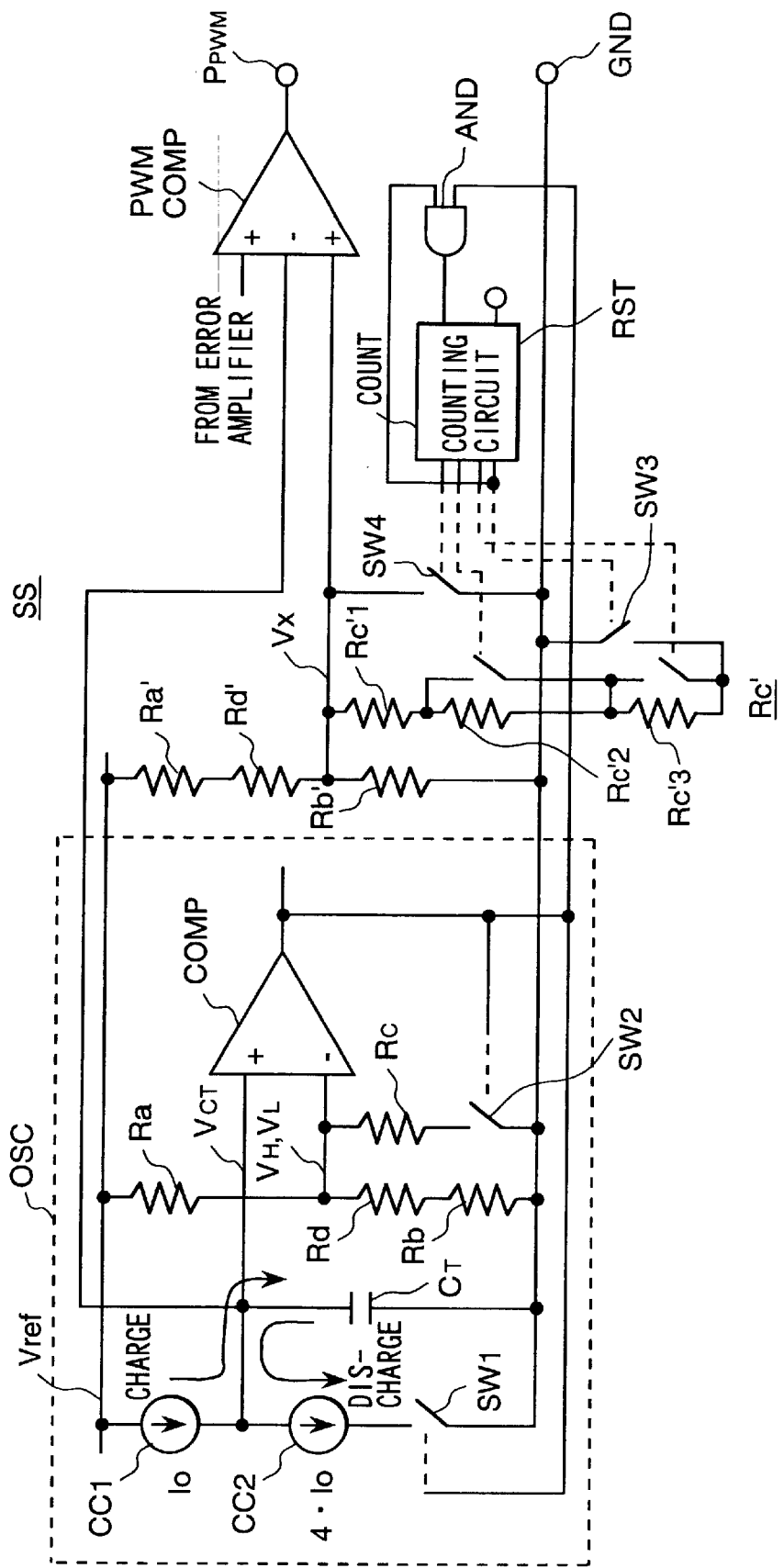
FIG. 12 is a circuit diagram showing a still further embodiment of a soft-start circuit of a switching power source in accordance with the present invention.

Further, as a method of multi-step switching, there is, for example, a construction of FIG. 12 in which the resistor Rc' is divided into a plurality of parts, and the divided resistors are connected in series, and a switch is individually arranged in both ends of each of all the divided resistors except one of the divided resistor. Operation of the circuit of FIG. 12 will be described below as a circuit performing the soft-start operation of FIG. 6. In the soft-start time period tsoft2, all of the newly added switches and the switch SW3 are turned on, and during the soft-start time periods tsoft3 and tsoft4 for controlling the switches, the newly added switches are turned off so that the reference voltage Vx may be gradually increased, and then the switch SW3 is turned off at the time when the total soft-start operation is completed. Thus, the multi-step switching can be performed through the method as described above.

Figure 7:
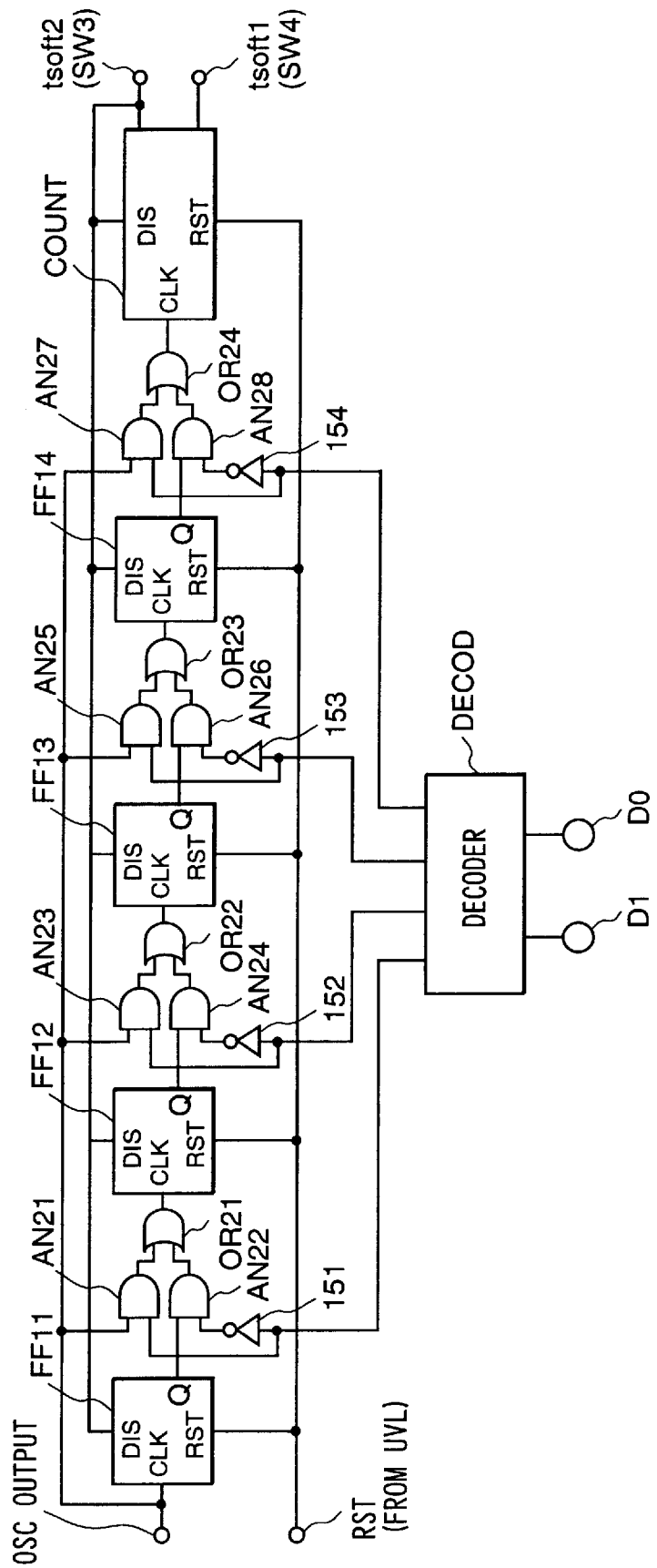
FIG. 7 is a circuit diagram showing another embodiment of a soft-start circuit of a switching power source in accordance with the present invention.

Next, another embodiment for changing the soft-start time period to an arbitrary time period is shown in FIG. 7. The embodiment of FIG. 7 is an example of a circuit structure capable of setting a four-system soft-start time period. In the embodiment of FIG. 7, a selector composed of flop-flops FF11 to FF14; inverters I15 to I54; AND circuits AN21 to AN28; and OR circuits OR21 to OR24 is arranged in the front stage of the counting circuit COUNT, and the soft-start time period is changed by determining based on 2-bit external set codes D0, D1 through a decoder DECOD and the selector whether or not the flip-flop signal is allowed to pass through the first stage, the second stage, . . . Although the description hear has been made on the example in which the soft-start time periods are set by the nth power of 2, setting of the soft-start time periods is not limited to this type of series. Further, number of flip-flop stages is not limited to four stages.

Figure 8:
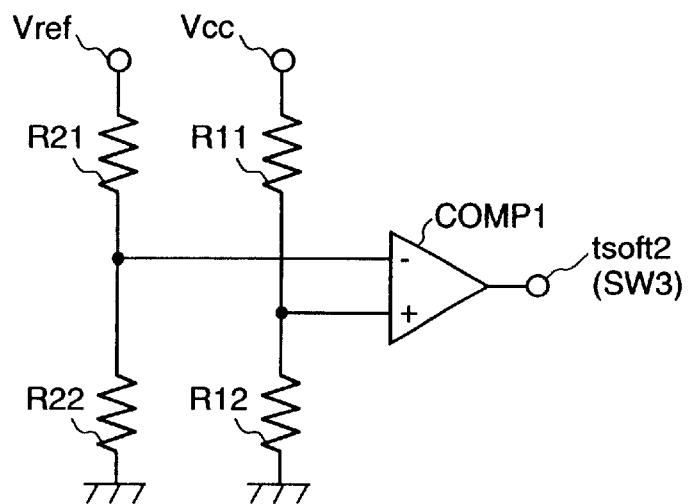
FIG. 8 is a circuit diagram showing a further embodiment of a soft-start circuit of a switching power source in accordance with the present invention.

In addition to the structure of FIG. 7 for changing the soft-start time periods to arbitrary time periods, another embodiment is shown in FIG. 8. In FIG. 8, as an example, a 95% voltage of the reference voltage Vref of the reference voltage generating circuit VREF is compared with a one-half voltage of the DC converted output Vcc of the power source using a comparator COMP1, and the switch SW3 is turned on when the voltage Vcc exceeds a 95% of the final value (the operating waveform is similar to that of FIG. 2). This method can automatically change the soft-start time period regardless of a load condition or values L, C of an output filter because the DC converted output Vcc of the power source is monitored. This part serves to determine only the time period tsoft2 in the FIG. 2, and accordingly the counting circuit is necessary in order to determine the time period tsoft1, as shown in FIG. 1. However, the logic of sequential circuit can be simplified because number of the flip-flop stages can be made 2 to 3 stages.

Figure 9:
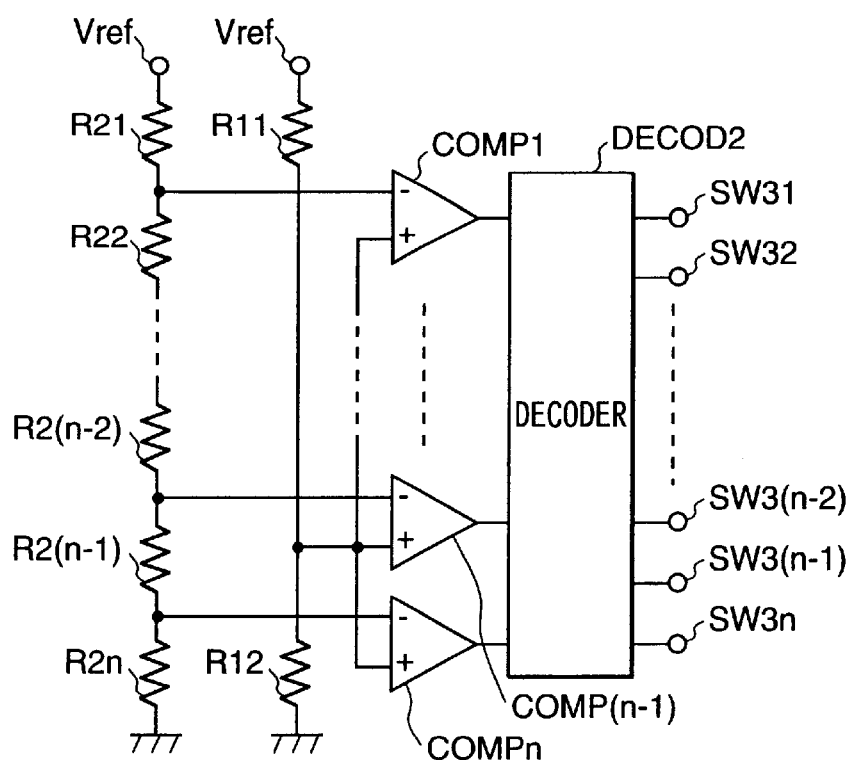
FIG. 9 is a circuit diagram showing an even further embodiment of a soft-start circuit of a switching power source in accordance with the present invention.

FIG. 9 shows a further embodiment in which the part of the tsoft2 of FIG. 8 is divided into plural parts. The reference voltage Vref is divided using a plurality of resistors to form many divided voltages, and the many divided voltages are individually compared with a one-half voltage of the DC converted output Vcc of the power source using a plurality of comparators COMP1 to COMPn, and it is determined based on the comparing results which switch or switches among the switches SW1 to SWn (the switch side is not shown in the figure) are turned on through a decoder DECOD2.

Figure 10:
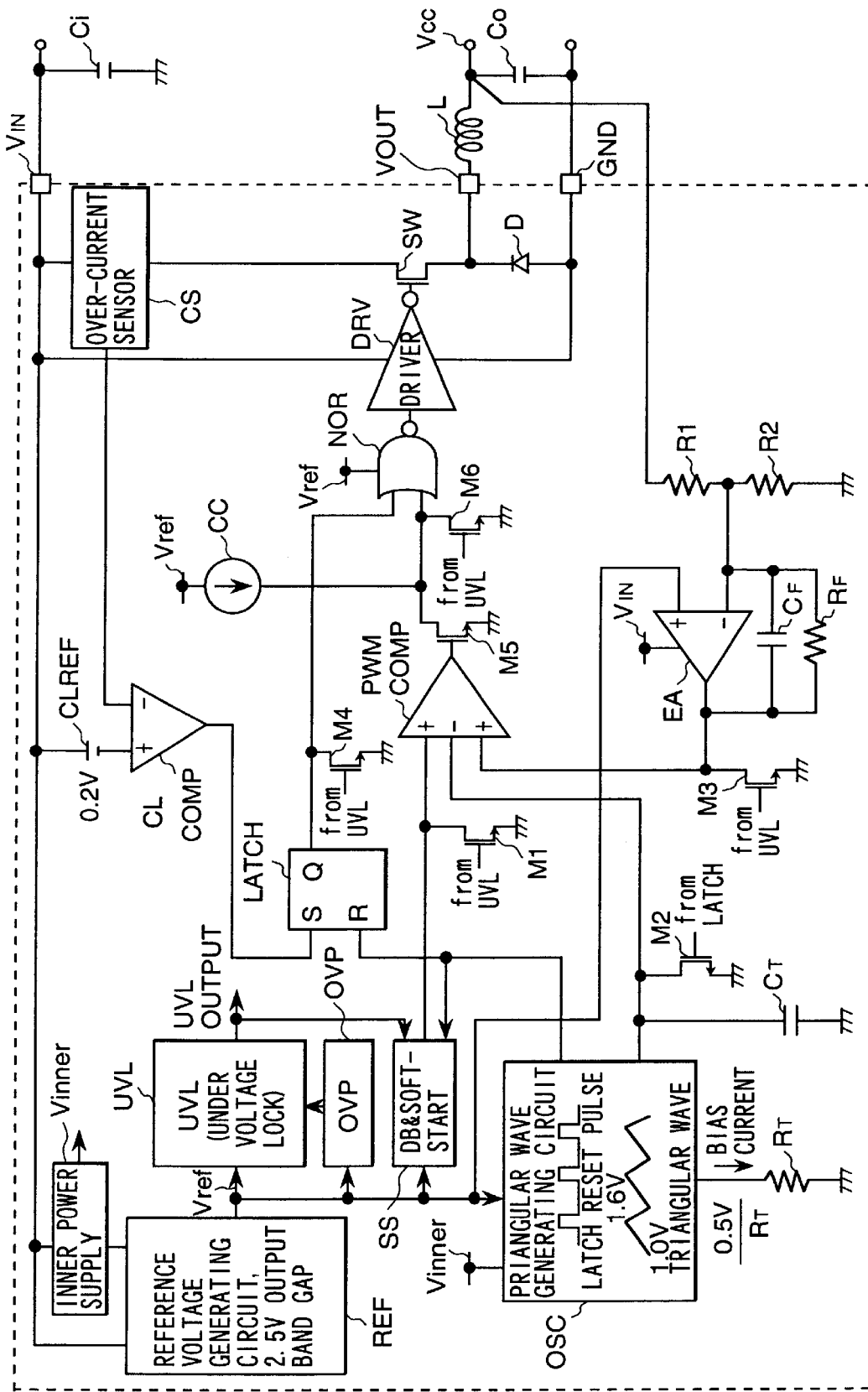
FIG. 10 is a functional block diagram of an embodiment of a switching power source to which the soft-start circuit in accordance with the present invention is applied.

FIG. 10 is a functional block diagram of an embodiment of a switching power source to which the soft-start circuit in accordance with the present invention is applied. The switching power source of FIG. 10 comprises a main switch SW; a flywheel diode D; an over current sensor CS; an over current comparison voltage CLREF; an over current comparator CLCOMP; a driver circuit DRV; a NOR circuit NOR; a source grounding circuit composed of a constant current source CC and a single channel MOS M6; a PWM comparator PWMCOMP; a triangular wave generating circuit OSC; an error amplifier EA; a UVL (under voltage lock) circuit UVL; an over voltage detecting circuit OVP; a soft-start circuit SS having a DB (dead band) function in accordance with the present invention; an inner power source Vinner, a reference voltage generating circuit VREF; a resistor RT and a capacitor CT for setting an oscillation frequency of the triangular wave generating circuit OSC; dividing voltage input resistors R1 and R2 for performing negative feedback a DC converted output Vcc of the power source to the error amplifier EA; a feedback circuit composed of a resistor RF and a capacitor CF; and single channel MOS's M1 to M5. These blocks are connected as shown in FIG. 10. The terminals of the power source LSI are an input power supply terminal VIN; an output terminal VOUT; and a grounding terminal GRD. The external parts used are only an input capacitor Ci connected to the input power supply terminal VIN; and an inductor L and an output capacitor Co connected between the output terminal VOUT and the grounding terminal GRD. Therefore, it is possible to form an LSI without any external adjusting parts necessary for the control circuit of the power source.

Further, the soft-start circuit in accordance with the present invention can be applied to a switching power source of a synchronous rectification type.

Figure 11:
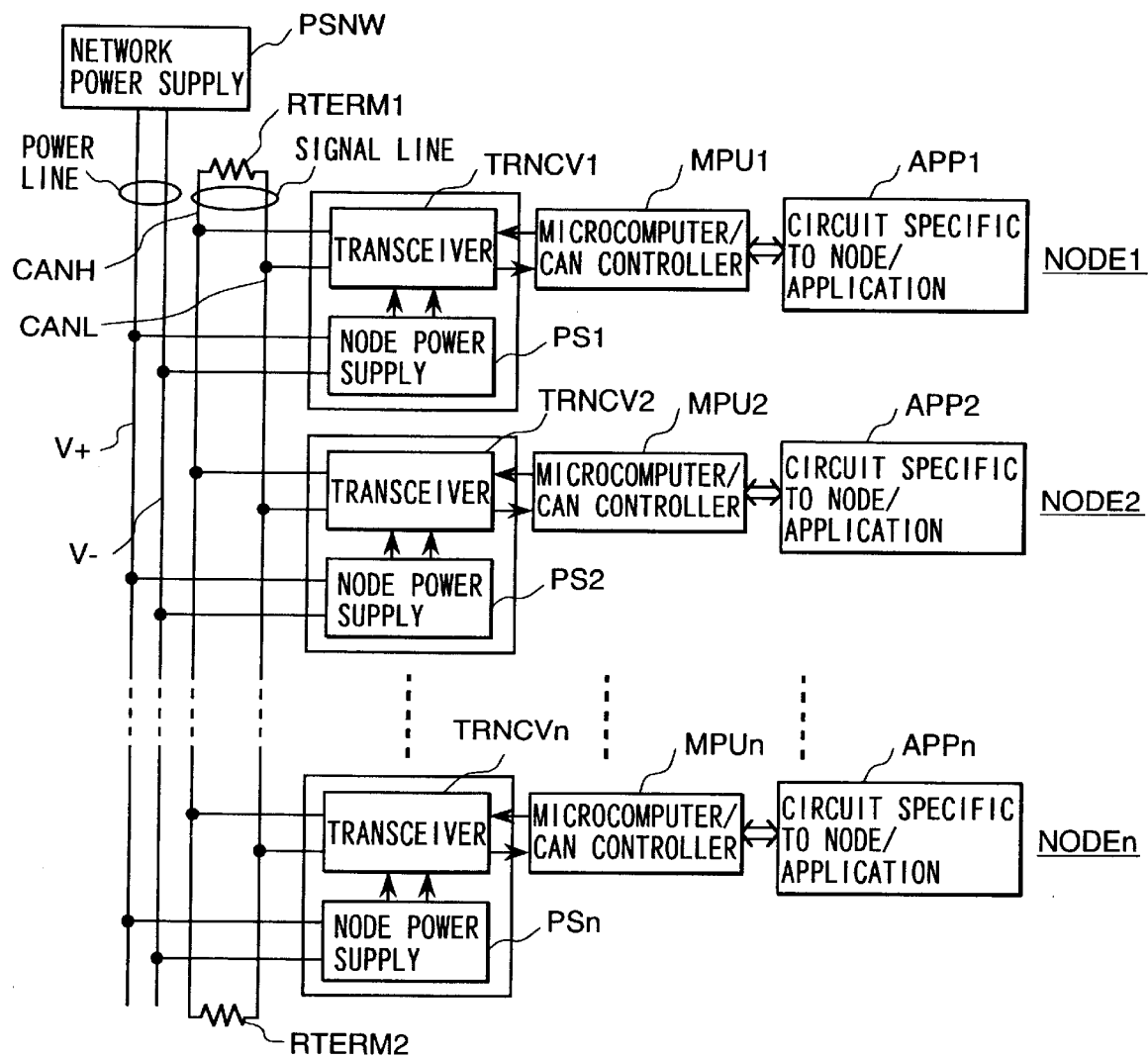
FIG. 11 is a functional block diagram of a transceiver to which the switching power source having the soft-start circuit in accordance with the present invention is applied.

FIG. 11 shows an embodiment in which the power source described above is applied to a power source circuit of a transceiver of DeviceNet (DeviceNet: a registered trademark of ODVA (open DeviceNet Vendor Association)). Referring to FIG. 11, a plurality of nodes 1 to n are connected to a serial interface bus cable (shield wire is not shown in the figure) composed of a pair of power wires V+ and V− and a pair of signal wires CANH and CANL. Each of the nodes (description will be made only on NODE1) is composed of a transceiver TRNCV1; a node power source PS1; a microcomputer/CAN controller MPU1; and a circuit APP1 specific to an application. The transceiver TRNCV1 communicates with the other transceivers through the pair of signal wires CANH, CANL which are terminated by two resistors RTEM1 and RTEM2. Electric power is supplied to the transceiver TRNCV1 from a network power source PSNW connected to the power wires V+, V− through a power source circuit PS1. In such a construction, when the network power source PSNW is turned on, the power source circuits PS1 to PSn are started at a time. In general, a load as heavy as more than 1.5 times of normal load may be put on the network power supply at starting operation of the power source. Therefore, it is necessary to use a power source having a large current capacity for the network power source PSNW. By using the node power source containing the soft-start circuit as that of the present embodiment, a power source having a small current capacity can be used for the network power source PSNW, and any external capacitor used in a conventional soft-start circuit is not necessary in order to perform soft starting. Therefore, number of the parts can be reduced, and accordingly the cost can be reduced. Furthermore, the transceiver and the node power source an be implemented on a single chip LSI.

The present switching power source described above can be applied to a power source of the other field network transceiver such as CAN (controller area network) of a serial bus system capable of performing real time processing.

According to the above, the soft-start circuit of the switching power source comprises the soft-start reference value setting part composed of the group of resistance networks and the group of switches using the same means as the upper-and-lower limit setting part composed of networks and switches for setting the upper and the lower limits of the amplitude of triangular wave of the triangular generating circuit, and by counting cycles of the triangular wave of the triangular wave generating circuit using the counting circuit at starting operation of the power source, the group of switches are sequentially switched to generate a comparing voltage, and as the result of comparison of the comparing voltage with the triangular wave, output can be generated so as to gradually increase the PWM pulse width from the minimum width. Therefore, the soft-start circuit having a simple circuit structure can be implemented in an LSI. Accordingly, since the external parts become unnecessary, number of the parts can be reduced, and the apparatus can be made small in size and low in cost.

Further, the plurality of comparators are used instead of the counting circuit, and the group of switches are switched in decreasing order of the outputs of the plurality of comparators each indicating the difference between the reference voltage and the DC converted output voltage of the power source. By doing so, the PWM pulse width of the PWM comparator can be gradually increased from the minimum width. Therefore, the same effects as the effects in the above can be obtained. Furthermore, there is an effect in that it is unnecessary to change the soft-start time period depending on the load or the values of L and C of the filter.

Further, the soft-start circuit can be applied to not only the node power source for DeviceNet (R) transceiver, but also to the power source for the other field network transceiver such as CAN, SDS (smart distributed system) PROFIBUS and so on, and accordingly a wide application of the soft-start circuit can be expected.

Further, since the power source LSI without external parts can be materialized, noise generated from the power source can be minimized by integrating, for example, the transceiver LSI and the power source LSI into a single chip. In addition, by applying the LSI to an apparatus or a system, the cost of the apparatus or the system can be reduced.

According to the present invention, it is possible to materialize a soft-start circuit which does not use any external capacitor.

What is claimed is:

1. A soft-start circuit of a switching power source, said switching power source comprising a triangular wave generating circuit and an error amplifier and a PWM comparator, in normal time PWM pulses being obtained by comparing an output amplitude of triangular wave of said triangular wave generating circuit with an output voltage of said error amplifier as a reference (comparing) voltage using said PWM comparator, wherein the same means as an upper-and-lower limit setting part for setting an upper and a lower limits of the amplitude of triangular wave of said triangular generating circuit is provided, said same means as an upper-and-lower limit setting part being composed of networks and switches, and in said same means as an upper-and-lower limit setting part cycles of the triangular wave of said triangular wave generating circuit are counted using a counting circuit at starting the power source in order to generate a plurality of reference voltages, and when said counting time reaches a desired time, said reference voltage is sequentially switched to generate PWM pulses so that a PWM pulse width of said PWM comparator may be gradually increased from a minimum width toward a wider width.

2. A soft-start circuit of a switching power source according to claim 1, wherein relationship between the counting time and a generating time is set so as to become an exponential function voltage using a CR circuit or an integration voltage using a capacitor.

3. A soft-start circuit of a switching power source according to claim 2, wherein arbitrary time periods can be obtained by set codes in order to obtain desired start timings.

4. A soft-start circuit of a switching power source according to claim 1, wherein a soft-start time period is determined by a voltage level before an output voltage of the switching power source reaches a final value, not determined by the counting circuit.

5. A soft-start circuit of a switching power source, which has the both configurations according to claim 4.

6. A soft-start circuit of a switching power source according to any one of claim 1 to claim 5, wherein a filter circuit is placed after said same means as the upper-and-lower limit setting part for setting an upper and a lower limits of the amplitude of triangular wave of said triangular generating circuit, said same means as the upper-and-lower limit setting part being composed of networks and switches.

7. A network transceiver to which electric power is supplied from a switching power source having the soft-start circuit according to any one of claim 1 to claim 5.

8. A switching power source having the soft-start circuit according to any one of claim 1 to claim 5.

* * * * *